US012775610B2

(12) United States Patent
Huang et al.

(10) Patent No.: US 12,775,610 B2
(45) Date of Patent: Oct. 27, 2026

(54) AUTOMATED DATA CROSS-CHECKING SYSTEM AND AUTOMATED DATA CROSS-CHECKING METHOD

(71) Applicant: Industrial Technology Research Institute, Hsinchu (TW)

(72) Inventors: Sian-Hong Huang, Hsinchu County (TW); Chin-Yang Lin, Changhua County (TW); Pu-Chun Lin, Taichung City (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 19/231,596

(22) Filed: Jun. 9, 2025

(65) Prior Publication Data

US 2026/0277873 A1 Sep. 17, 2026

(30) Foreign Application Priority Data

Mar. 12, 2025 (TW) ................................ 114109044

(51) Int. Cl.
*G06F 16/23* (2019.01)

(52) U.S. Cl.
CPC ................................ *G06F 16/2365* (2019.01)

(58) Field of Classification Search
CPC ................................................... G06F 16/2365
See application file for complete search history.

(56) References Cited

U.S. PATENT DOCUMENTS 11,657,071 B1 5/2023 Rywelska et al.
2022/0035799 A1 * 2/2022 Bhutada .................. G06F 40/30

(Continued)

FOREIGN PATENT DOCUMENTS

CN 116225439 6/2023
CN 117473093 4/2024

(Continued)

OTHER PUBLICATIONS

Suravi Mondal et al., "Natural Language Query to NoSQL Generation Using Query-Response Model", IEEE, pp. 85-90 (Year: 2019).*

(Continued)

*Primary Examiner* — Jared M Bibbee
(74) *Attorney, Agent, or Firm* — JCIPRNET

(57) ABSTRACT

An automated data cross-checking method includes executing following steps through a processor: receiving a question string and verifying a key field content of the question string; reading and executing agent programs to parse the key field content; determining whether to execute a data cross-check based on the key field content; in response to determining to execute the data cross-check, searching and reading datasets corresponding to the key field content, executing the agent programs to parse fields of each dataset, generating a cross-checking instruction, and outputting a cross-checking prompt, where each dataset includes a plurality of fields; receiving a verification string related to the cross-checking prompt; executing the agent programs to generate a program code based on the cross-checking instruction and the verification string; executing the program code to generate a cross-checking result file; outputting a cross-checking result string corresponding to the question string based on the cross-checking result file.

18 Claims, 4 Drawing Sheets

(56) References Cited

U.S. PATENT DOCUMENTS

| | | | | |
|---|---|---|---|---|
| 2024/0184991 | A1* | 6/2024 | Mahabaleshwarkar | G06F 40/35 |
| 2024/0303235 | A1* | 9/2024 | Kulkarni | G06F 16/24522 |
| 2024/0303440 | A1* | 9/2024 | Fabian | G06F 40/18 |
| 2026/0142888 | A1* | 5/2026 | Udupi | H04L 41/16 |

FOREIGN PATENT DOCUMENTS

| | | |
|---|---|---|
| CN | 117312372 | 5/2024 |
| CN | 118535679 | 8/2024 |
| CN | 118568212 | 8/2024 |
| CN | 118569237 | 8/2024 |
| CN | 117473062 | 10/2024 |
| TW | 201926074 | 7/2019 |
| TW | 202006511 | 2/2020 |
| TW | 1856905 | 9/2024 |

OTHER PUBLICATIONS

"Office Action of Taiwan Counterpart Application", issued on Nov. 10, 2025, p. 1-p. 8.

Luyu Gao et al., "PAL: Program-aided Language Models", Proceedings of the 40th International Conference on Machine Learning, Jul. 23-29, 2023, pp. 1-36.

Chan Hee Song et al., "LLM-Planner: Few-Shot Grounded Planning for Embodied Agents with Large Language Models", Proceedings of the IEEE/CVF International Conference on Computer Vision (ICCV), Oct. 2023, pp. 2998-3009.

Yujia Qin et al., "TOOLLLM: Facilitating Large Language Models to Master 16000+ Real-World APIS", retrieved from arXiv database, arXiv:2307.16789v2 [cs.AI], Oct. 3, 2023, pp. 1-24.

Shunyu Yao et al., "REACT: Synergizing Reasoning and Acting in Language Models", retrieved from arXiv database, arXiv:2210.03629v3 [cs.CL], Mar. 10, 2023, pp. 1-33.

Jason Wei et al., "Chain-of-Thought Prompting Elicits Reasoning in Large Language Models", retrieved from arXiv database, arXiv:2201.11903v6 [cs.CL], Jan. 10, 2023, pp. 1-43.

Shunyu Yao et al., "Tree of Thoughts: Deliberate Problem Solving with Large Language Models", retrieved from arXiv database, arXiv:2305.10601v2 [cs.CL], Dec. 3, 2023, pp. 1-14.

* cited by examiner

Humidity vs Visibility (km)

Scatterplot_1.png

Scatterplot_2.png

AUTOMATED DATA CROSS-CHECKING SYSTEM AND AUTOMATED DATA CROSS-CHECKING METHOD

CROSS-REFERENCE TO RELATED APPLICATION

This application claims the priority benefit of Taiwan application serial no. 114109044, filed on Mar. 12, 2025. The entirety of the above-mentioned patent application is hereby incorporated by reference herein and made a part of this specification.

TECHNICAL FIELD

The disclosure relates to an automated data cross-checking system and an automated data cross-checking method.

BACKGROUND

Data analysis tools require professional expertise in statistics and data processing, with stringent demands for advanced statistical knowledge and precise data processing workflows. This complexity often hinders execution. Currently, the widely used ChatGPT lacks data cleaning capabilities, leading to the generation of incorrect information. Furthermore, as data volume increases, enterprises face challenges in cross-checking data from multiple sources, particularly when datasets have inconsistent field names or formatting standards for field data, making field name-based cross-checking impractical.

Therefore, how to provide users with natural language interfaces for databases to execute data analysis, automate task decomposition and planning, generate the high-quality, low-error-rate program code, and fully perform statistical analysis and chart generation is a critical challenge that demands efforts.

SUMMARY

An embodiment of the disclosure provides an automated data cross-checking system that includes a memory and a processor, and the processor is coupled to the memory. The memory is configured to store a plurality of agent programs. The processor is configured to receive a question string and verify a key field content of the question string, read and execute the agent programs to parse the key field content, determine whether to execute a data cross-check based on the key field content. In response to executing the data cross-check based on the key field content, the processor is configured to search and read a plurality of datasets related to the key field content, execute the agent programs to parse fields of each dataset, generate a cross-checking instruction, and output a corresponding cross-checking prompt, wherein each dataset includes a plurality of the fields. The processor is further configured to receive a verification string related to the cross-checking prompt, execute the agent programs to generate a program code based on the cross-checking instruction and the verification string, execute the program code to generate a cross-checking result file, and output a cross-checking result string corresponding to the question string based on the cross-checking result file.

Another embodiment of the disclosure provides an automated data cross-checking method that includes executing through a processor: receiving a question string and verifying a key field content of the question string, reading and executing a plurality of agent programs to parse the key field content, determining whether to execute a data cross-check based on the key field content, in response to executing the data cross-check based on the key field content, searching and reading a plurality of datasets related to the key field content, executing the agent programs to parse fields of each dataset, generating a cross-checking instruction, and outputting a corresponding cross-checking prompt, wherein each dataset includes a plurality of the fields. The automated data cross-checking method further includes executing through a processor: receiving a verification string related to the cross-checking prompt, executing the agent programs to generate a program code based on the cross-checking instruction and the verification string, executing the program code to generate a cross-checking result file, and outputting a cross-checking result string corresponding to the question string based on the cross-checking result file.

Based on the above, the automated data cross-checking system and the automated data cross-checking method provided in one or more embodiments of the disclosure can provide the users with natural language interfaces for databases to execute data analysis, automate task decomposition and planning, generate the high-quality, low-error-rate program code, and fully perform statistical analysis and chart generation.

To make the disclosure more clearly comprehensible, exemplary embodiments are described below in detail with reference to the accompanying drawings.

BRIEF DESCRIPTION OF THE DRAWINGS

The accompanying drawings are included to provide a further understanding of the disclosure, and the accompanying drawings are incorporated in and constitute a part of this specification. The drawings illustrate the exemplary embodiments of the disclosure, and together with the description, serve to explain the principle of the disclosure.

DETAILED DESCRIPTION OF DISCLOSURE EMBODIMENTS

Some exemplary embodiments of the disclosure will be described in detail in conjunction with the accompanying drawings. When the same reference numbers appear in different drawings, they will be regarded as the same or similar elements. These exemplary embodiments are only a part of the disclosure and do not disclose all possible implementation manner provided in the disclosure. More precisely, these exemplary embodiments are merely examples of the methods and systems in the patent claims of the disclosure.

Figure 1:
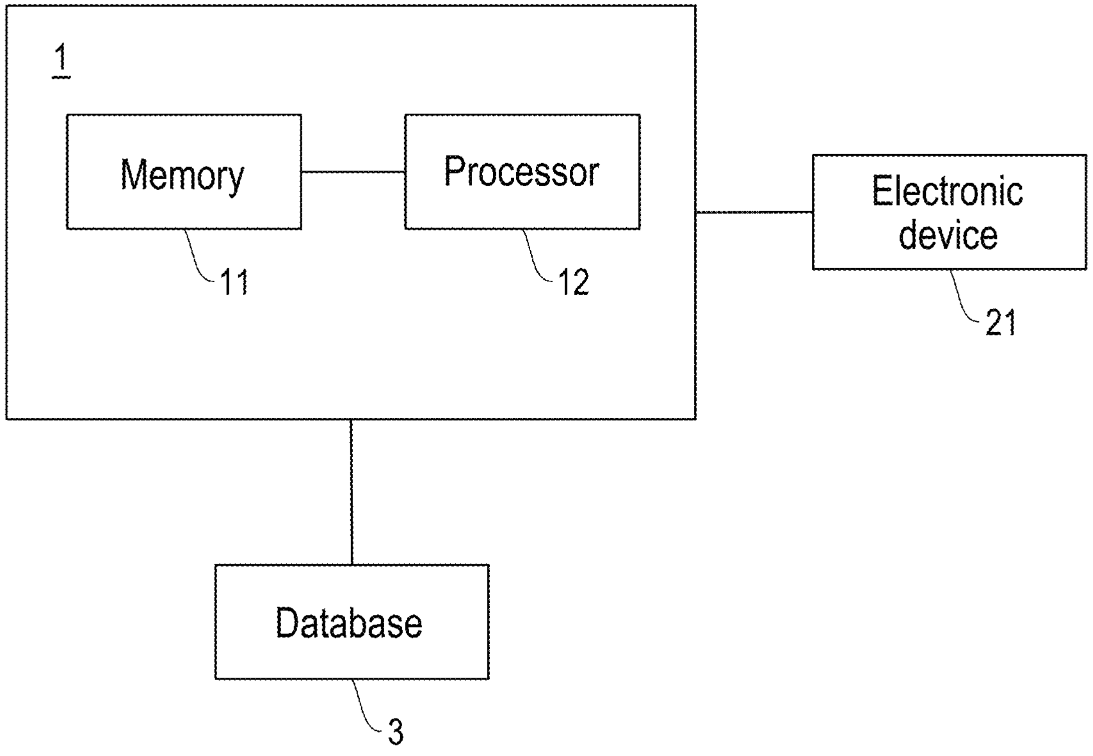
FIG. 1 is a schematic diagram illustrating an automated data cross-checking system according to an embodiment of the disclosure.

FIG. 1 is a schematic diagram illustrating an automated data cross-checking system 1 according to an embodiment of the disclosure. The automated data cross-checking system 1 of the disclosure includes a memory 11 and a processor 12. First, as shown in FIG. 1, various components and configuration relationships in the automated data cross-checking system 1 are introduced, and detailed functions will be disclosed together with subsequent embodiments.

The memory 11 is configured to store a plurality of agent programs. In practice, the memory 11 can be, for instance, a static random-access memory (SRAM), a dynamic random-access memory (DRAM), or another memory, which should however not be construed as a limitation in the disclosure.

The processor 12 is coupled to the memory 11 and configured to execute an automated data cross-checking method. Specifically, the automated data cross-checking system 1 is coupled to an electronic device 21, and a user of the electronic device 21 can input a question string to the automated data cross-checking system 1 through the electronic device 21. After the automated data cross-checking system 1 receives the question string, it executes the automated data cross-checking method through the processor 12 to output a cross-checking result string corresponding to the question string to the electronic device 21.

In practice, the processor 12 can be, for instance, a central processing unit (CPU), an application processor (AP), or another programmable general-purpose or special-purpose microprocessor, digital signal processor (DSP), similar device, integrated circuit, and combinations thereof. The automated data cross-checking system 1 can be implemented on a computer device, such as a desktop computer, a laptop computer, a tablet computer, a workstation, or another computer device with computing functions. The memory 11 can be, for instance, a SRAM, a DRAM, or another memory, which should not be construed as a limitation in the disclosure.

Figure 2:
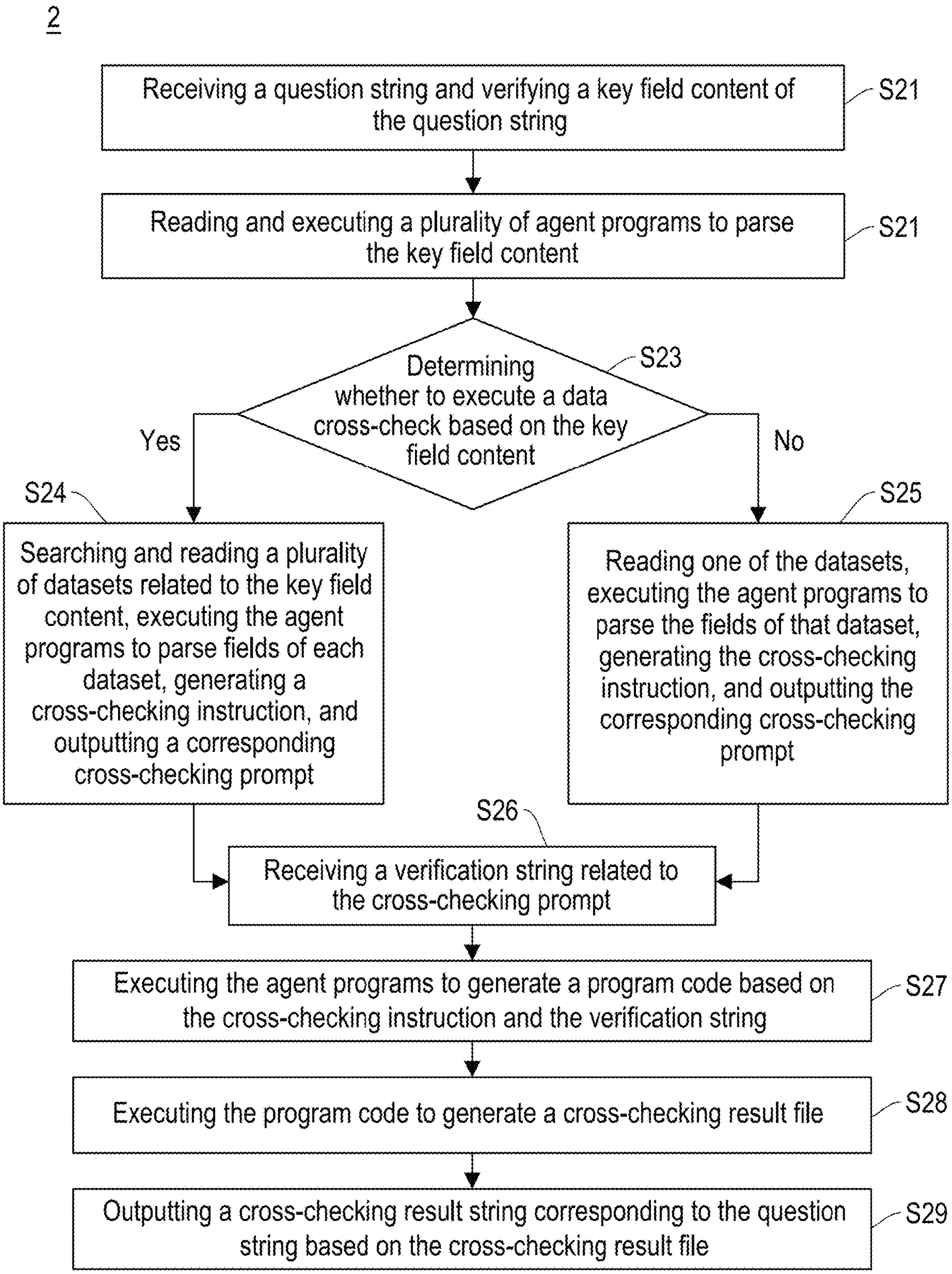
FIG. 2 is a flowchart illustrating an automated data cross-checking method according to an embodiment of the disclosure.

The processor 12 is configured to execute the automated data cross-checking method 2. FIG. 2 is a flowchart illustrating an automated data cross-checking method 2 according to an embodiment of the disclosure. The automated data cross-checking method 2 depicted in FIG. 2 can be executed by the processor 12 of the automated data cross-checking system 1 depicted in FIG. 1, and the automated data cross-checking method 2 includes steps S21 to S29. The following explanation is provided to explain the automated data cross-checking system 1 and the steps of the automated data cross-checking method 2. Please refer to FIG. 1 and FIG. 2 simultaneously.

First, in step S21, the processor 12 receives a question string and verifies at least one key field content of the question string. Specifically, the user inputs a question string through an input unit of the electronic device 21, and the electronic device 21 sends the question string to the automated data cross-checking system 1, which receives the question string through the processor 12. The question string is in natural language.

In step S22, the processor 12 reads and executes a plurality of agent programs to parse the key field content. In an embodiment of the disclosure, each of the agent programs includes a machine learning model, which is applied to process and parse the key field content of the question string.

In step S23, the processor 12 determines whether to execute a data cross-check based on the key field content. Specifically, if the key field content is distributed across different datasets, the processor 12 needs to execute the data cross-check on the datasets related to the key field content to generate a cross-checking instruction; by contrast, if the key field content is distributed within one dataset, the processor 12 does not need to execute the data cross-check related to the key field content and can directly generate the cross-checking instruction.

In response to executing the data cross-check based on the key field content, in step S24, the processor 12 searches and reads the datasets related to the key field content, executes the agent programs to parse a plurality of fields of each dataset, generates a cross-checking instruction, and outputs a corresponding cross-checking prompt, wherein each dataset includes the fields.

In response to not executing the data cross-check based on the key field content, in step S25, the processor 12 reads one of the datasets related to the key field content from the datasets, executes the agent programs to parse the fields of that dataset, generates the cross-checking instruction, and outputs the corresponding cross-checking prompt.

After the cross-checking prompt is generated, the automated data cross-checking system 1 sends the cross-checking prompt to the electronic device 21. After the user sees the cross-checking prompt through an output unit of the electronic device 21, the user can respond to the cross-checking prompt by inputting a verification string through the input unit of the electronic device 21.

After that, the electronic device 21 sends the verification string to the automated data cross-checking system 1, and in step S26, the processor 12 receives the verification string related to the cross-checking prompt.

In step S27, the processor 12 executes the agent programs to generate a program code based on the cross-checking instruction and the verification string.

In step S28, the processor 12 executes the program code to generate a cross-checking result file.

In step S29, the processor 12 outputs a cross-checking result string corresponding to the question string based on the cross-checking result file. The automated data cross-checking system 1 sends the cross-checking result string to the electronic device 21, and the user sees the cross-checking result string corresponding to the question string through the output unit of the electronic device 21.

The cross-checking result file is stored in the memory 11 through the processor 12, and the automated data cross-checking system 1 also sends the cross-checking result file to the electronic device 21 and stores it in a storage unit of the electronic device 21. The cross-checking result string further includes a location where the cross-checking result file is stored in the storage unit of the electronic device 21.

The automated data cross-checking system 1 can obtain the datasets mentioned in step S24 and step S25 from different places through the processor 12. In an embodiment of the disclosure, before inputting the question string through the input unit of the electronic device 21, the user can input at least one dataset through the input unit of the electronic device 21, and the electronic device 21 sends the at least one dataset to the automated data cross-checking system 1, which can receive the at least one dataset through the processor 12 and store it in the memory 11. In another embodiment, the datasets are pre-stored in an external or internal database 3 connected to the automated data cross-checking system 1, and the automated data cross-checking system 1 can connect the database 3 and receive one or more datasets through the processor 12.

Embodiments where the automated data cross-checking system 1 and the automated data cross-checking method 2 are required to execute the data cross-check based on the key field content are further explained below with reference to FIG. 1 and FIG. 2 simultaneously.

First, the user inputs a question string "What is the Pearson correlation coefficient between 'Humidity' and 'Visibility (km)'?" through the input unit of the electronic device 21. The electronic device 21 sends the question string to the automated data cross-checking system 1, which receives the question string through the processor 12 (step S21).

When the processor 12 reads the question string "What is the Pearson correlation coefficient between 'Humidity' and 'Visibility (km)'?", it initiates question parsing. The processor 12 first verifies the relevant fields within the question string and executes a plurality of agent programs to parse the question, i.e., parsing the key field contents (step S22). After the question string is parsed by the processor 12, the processor 12 obtains the key field contents, which include 'Humidity' and 'Visibility (km)'.

Next, the processor 12 determines whether to execute the data cross-check based on the key field contents 'Humidity' and 'Visibility (km)' (step S23).

Here, assuming the key field contents 'Humidity' and 'Visibility (km)' are distributed in different datasets, the processor 12 determines that the cross-checking instruction is required to be executed. In response to executing the data cross-check based on the key field contents 'Humidity' and 'Visibility (km)', the processor 12 searches and reads the datasets related to the key field contents (step S24).

The key field content 'Humidity' is related to a field name in a dataset Weather_a.csv, and the key field content 'Visibility (km)' is related to a field name in a dataset Weather_b.csv. The contents of the dataset Weather_a.csv and the dataset Weather_b.csv are shown below, respectively.

Dataset Weather_a.csv

| address | Date | . . . | Humidity |
|---|---|---|---|
| Yixin First Street, Beitun District, Taichung City ("Taichung City" recorded as "台中市" in Chinese; using the informal simplified Chinese character '台" for "Tai") | 2005 Dec. 31 | . . . | 0.89 |
| Zhongqing West First Street, Beitun District, Taichung City ("Taichung City" recorded as "台中市" in Chinese; using the informal simplified Chinese character '台" for "Tai") | 2006 Jan. 1 | . . . | 0.85 |
| . . . | . . . | . . . | . . . |

Dataset Weather_b.csv

| Address | Time | . . . | Visibility (km) |
|---|---|---|---|
| Yixin First Street, Beitun District, Taichung City ("Taichung City" recorded as "臺中市" in Chinese; using the standard traditional Chinese character "臺" for "Tai") | 2005 Dec. 31 | . . . | 9.982 |
| Zhongqing West First Street, Beitun District, Taichung City ("Taichung City" recorded as "臺中市" in Chinese; using the standard traditional Chinese character "臺" for "Tai") | 2006 Jan. 1 | . . . | 9.9015 |
| . . . | . . . | . . . | . . . |

After comparing the dataset Weather_a.csv and the dataset Weather_b.csv, it can be found that there are some differences in format between the field names and field data in the dataset Weather_a.csv and the dataset Weather_b.csv.

For instance, the field data corresponding to the field name "address" in the dataset Weather_a.csv and the field name "Address" in the dataset Weather_b.csv are both addresses, which are determined to be the same content. The field data corresponding to the field name "Date" in the dataset Weather_a.csv and the field name "Time" in the dataset Weather_b.csv are both date information.

Additionally, the date format in the dataset Weather_a.csv is 2005 Dec. 31, but the date format in the dataset Weather_b.csv is 2005 Dec. 31, which are different formats. The address in the field data of the dataset Weather_a.csv records "Taichung city" as "台中市" in Chinese (using the informal simplified Chinese character "台" for "Tai"), while the address in the field data of the dataset Weather_b.csv records "Taichung city" as "臺中市" in Chinese (using the standard traditional Chinese character "臺" for "Tai"), i.e., parts of the addresses use different forms of the same Chinese character, thus resulting in inconsistent address formats between the datasets.

Through the processor 12 executing the agent programs to parse a plurality of fields of the dataset Weather_a.csv and the dataset Weather_b.csv, a cross-checking instruction is generated and configured to output a cross-checking prompt (in step S24). It should be specifically noted that the automated data cross-checking system 1 and the automated data cross-checking method 2 provided in this disclosure can generate the cross-checking instruction for fields with different field names but similar field information.

In an embodiment of the disclosure, the cross-checking prompt includes a modification prompt for the field name of each field in each dataset. In an embodiment of the disclosure, the cross-checking prompt includes a modification prompt for the field data of each field in each dataset. In an embodiment of the disclosure, the cross-checking prompt includes a merging prompt for at least one of the fields of a plurality of datasets.

The cross-checking prompt is shown as follows:

| Parsing process suggestions on a question requiring cross-checking of the two datasets Weather_a.csv and Weather_b.csv: |
|---|
| 1. Verify Field Name Consistency<br>Verify that the field names in the data, "address" in Weather_a.csv and "Address" in Weather_b.csv contain the same content and should be unified to the same name "Address_address".<br>Date in Weather_a.csv and Time in Weather_b.csv are both date information and should be standardized to the same field name Date_Time.<br>2. Standardize Date Format<br>The date format in Weather_a.csv is 2005 Dec. 31, but the date format in Weather_b.csv is 2005 Dec. 31. These data formats are unified to a YYYY-MM-DD format, which can be converted using a pd.to_datetime function.<br>3. Find Merge Keys |

-continued

| Parsing process suggestions on a question requiring cross-checking of the two datasets Weather_a.csv and Weather_b.csv: |
| --- |
| Use the address Address_address and the date Date_Time as two fields for merging.<br>4. Data Preprocessing<br>After data merging, check if there is any missing value. |

Additionally, the processor 12 performs data preprocessing on the dataset Weather_a.csv and the dataset Weather_b.csv to merge the two datasets into one dataset Weather_pre.csv, which is as shown below.

Dataset Weather_pre.csv

| address | Date | Humidity | . . . | Visibility (km) |
| --- | --- | --- | --- | --- |
| Taichung City Beitun District Yixin First Street ("Taichung City" recorded as "台中市" in Chinese; using the informal simplified Chinese character "台" for "Tai") | 2005 Dec. 31 | 0.89 | . . . | 9.982 |
| Taichung City Beitun District Zhongqing West First Street ("Taichung City" recorded as "台中市" in Chinese; using the informal simplified Chinese character "台" for "Tai"" | 2006 Jan. 1 | 0.85 | . . . | 9.9015 |
| . . . | . . . | . . . | . . . | . . . |

After the cross-checking prompt is generated, the automated data cross-checking system 1 sends the cross-checking prompt to the electronic device 21. After the user sees the cross-checking prompt through the output unit of the electronic device 21, the user may respond to the cross-checking prompt by inputting the verification string "OK" through the input unit of electronic device 21. The electronic device 21 sends the verification string "OK" to the automated data cross-checking system 1, and the processor 12 receives the verification string "OK" (in step S26).

After the automated data cross-checking system 1 receives the verification string "OK", the processor 12 executes the agent programs to generate a program code based on the cross-checking instruction and the verification string (in step S27).

Figure 3:
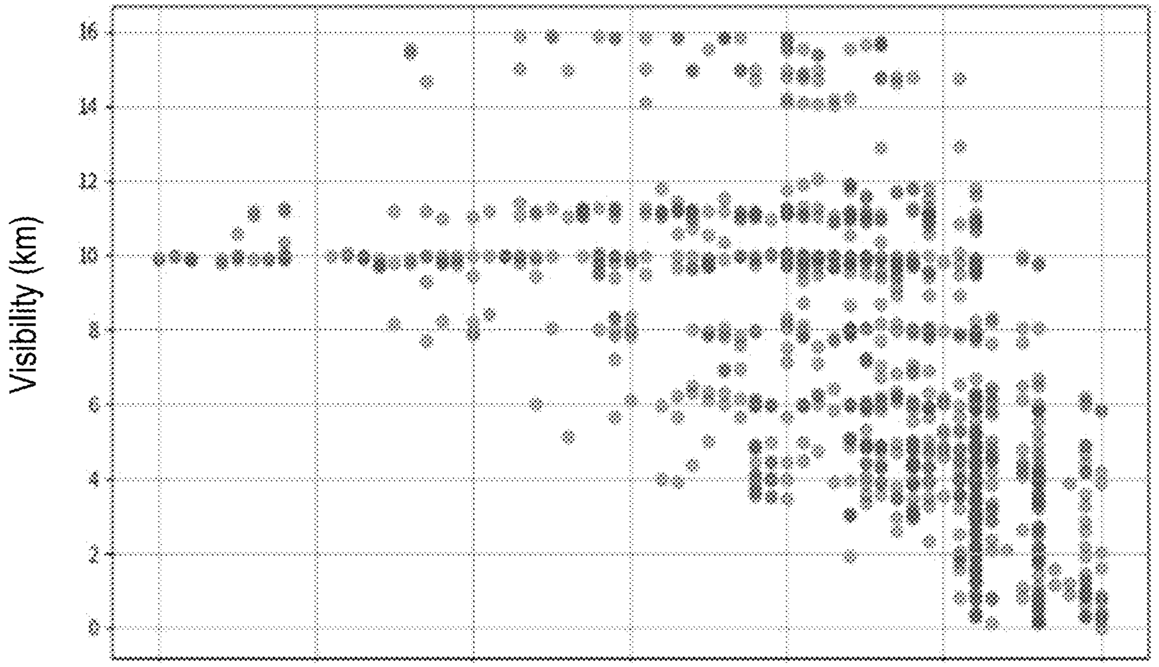
FIG. 3 is a schematic diagram illustrating a cross-checking result file according to an embodiment of the disclosure.

The processor 12 executes the program code to generate a cross-checking result file scatterplot_1.png (in step S28). FIG. 3 is a schematic diagram illustrating the cross-checking result file scatterplot_1.png according to an embodiment of the disclosure.

The processor 12 outputs a cross-checking result string corresponding to the question string based on the cross-checking result file scatterplot_1.png (in step S29).

The cross-checking result string is shown as follows:

```
Analysis results:
Calculate the Pearson correlation coefficient between
'Humidity' and 'Visibility (km)' and obtain −0.542711.
There is a negative correlation between 'Humidity'
and 'Visibility (km)'. This result has been stored in the
form of a scatter plot in the 'scatterplot_1.png' file
in the './results' directory.
```

The automated data cross-checking system 1 sends the cross-checking result string to the electronic device 21, and the user sees the cross-checking result string corresponding to the question string through the output unit of the electronic device 21. Through the cross-checking result string, the user can obtain a result corresponding to the question string and can locate the cross-checking result file according to the cross-checking result string.

Embodiments where the automated data cross-checking system 1 and the automated data cross-checking method 2 are not required to execute the data cross-check based on the key field content are further explained below with reference to FIG. 1 and FIG. 2 simultaneously.

First, the user inputs the question string "Based on the existing file, analyze the humidity ('Humidity') in the datasets and find the maximum humidity" through the input unit of the electronic device 21. The electronic device 21 sends the question string to the automated data cross-checking system 1, which receives the question string through the processor 12 (in step S21).

When the processor 12 reads the question string "Based on the existing file, analyze the humidity ('Humidity') in the datasets and find the maximum humidity", it initiates question parsing. The processor 12 first verifies the relevant fields within the question string and execute a plurality of agent programs to parse the question, i.e., parsing the key field content (in step S22). After the question string is parsed by the processor 12, the processor 12 obtains the key field content as 'Humidity'.

Next, the processor 12 determines whether to execute a data cross-check based on the key field content 'Humidity' (in step S23).

The processor 12 reads a dataset Weather_a.csv related to the key field content 'Humidity' from a plurality of datasets and determines that it is not necessary to execute any cross-checking instruction. The processor 12 executes the agent programs to parse a plurality of fields of the dataset Weather_a.csv, generates a cross-checking instruction, and outputs a corresponding cross-checking prompt accordingly (in step S25).

The cross-checking prompt is shown as follows:

```
'Humidity' in the dataset Weather_a.csv does
not need to be cross-checked. Below is the complete
process for analyzing the maximum humidity value:
Data preprocessing:
Verify whether there is any missing value
in the Humidity field of the dataset
Weather a.csv and remove the missing data.
```

After the cross-checking prompt is generated, the automated data cross-checking system 1 sends the cross-checking prompt to the electronic device 21. After the user sees the cross-checking prompt through the output unit of the electronic device 21, the user can respond to the cross-checking prompt by inputting the verification string "OK" through the input unit of the electronic device 21. The electronic device 21 sends the verification string "OK" to the automated data cross-checking system 1, which receives the verification string "OK" through the processor 12 (in step S26).

After the automated data cross-checking system 1 receives the verification string "OK", it executes the agent programs through the processor 12 to generate a program code based on the cross-checking instruction and the verification string (in step S27).

Figure 4:
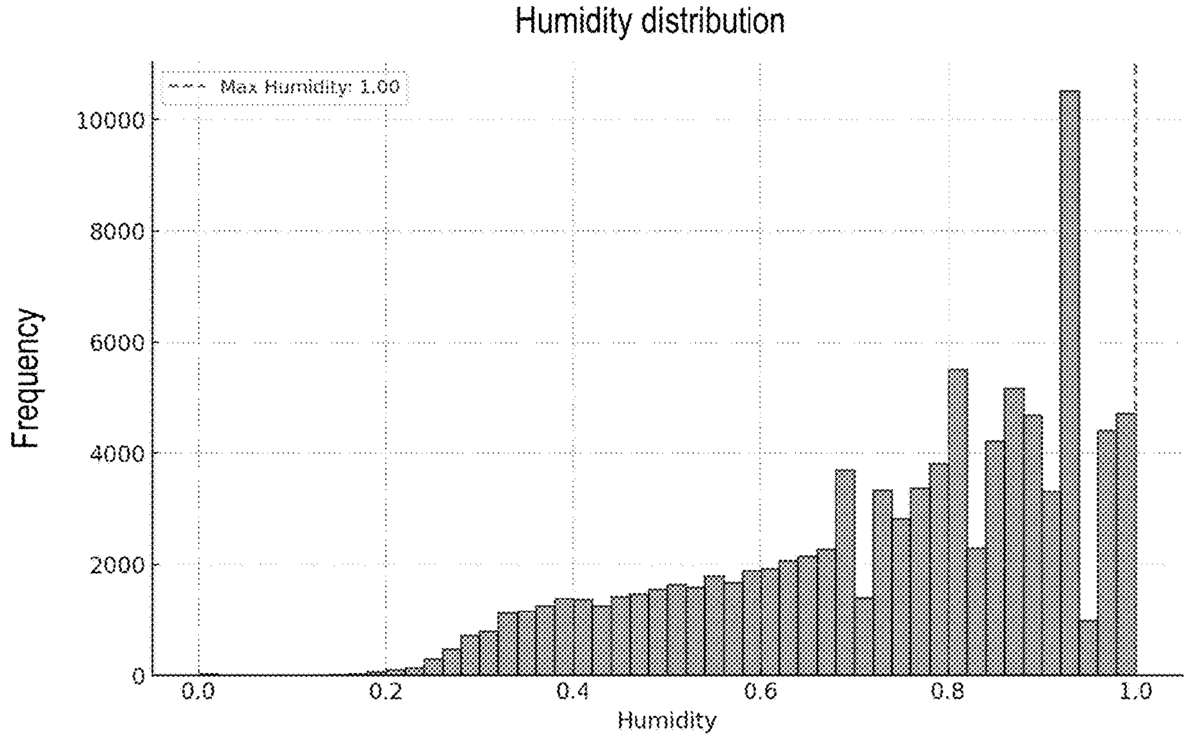
FIG. 4 is a schematic diagram illustrating a cross-checking result file according to another embodiment of the disclosure.

The processor 12 executes the program code to generate a cross-checking result file scatterplot_2.png (in step S28). FIG. 4 is a schematic diagram illustrating the cross-checking result file scatterplot_2.png according to another embodiment of this disclosure.

The processor 12 outputs a cross-checking result string corresponding to the question string based on the cross-checking result file scatterplot_2.png (in step S29).

The cross-checking result string is shown as follows:

```
Analysis results:
The Humidity field in the dataset Weather_a.csv
has 53 missing values filled with 0, and
the maximum value of 'Humidity' is 1.0.
```

The automated data cross-checking system 1 sends the cross-checking result string to the electronic device 21, and the user sees the cross-checking result string corresponding to the question string through the output unit of the electronic device 21.

The automated data cross-checking system 1 and the automated data cross-checking method 2 provided in one or more embodiments of this disclosure can enhance the logic of program generation, possess knowledge of standardized data analysis processes, and improve accuracy. In a quantitative indicator evaluation, the comparison target is ChatGPT-4o, with each question tested in a newly opened window. 30 data cross-checking test questions are generated based on the weather datasets and then manually screened and adjusted. Evaluation indicators adopted below are Pass rate and Coverage rate. The definition of the Pass rate is the ability to answer questions normally without generating any error message. The definition of the Coverage rate is to manually determine whether the answer is correct.

The test examples are provided below:

| Test Item | Question | Answer |
|---|---|---|
| Data cross-check, statistical analysis | Based on the existing file, calculate the average temperature ('Temperature (C.)') when visibility ('Visibility (km)') is greater than or equal to 10 km and the average temperature ('Temperature (C.)') when visibility ('Visibility (km)') is less than 10 km. | Average temperature when visibility is less than 10 km: 9.12° C.<br>Average temperature when visibility is greater than or equal to 10 km: 14.68° C. |
| Data cross-check, statistical analysis | Based on the existing file, calculate the average apparent temperature ('Apparent Temperature (C.)') when wind speed ('Wind Speed (km/h)') is greater than or equal to 20 km/h and the average apparent temperature ('Apparent Temperature (C.)') when wind speed ('Wind Speed (km/h)') is less than 20 km/h? | Average apparent temperature when wind speed is below 20 km/h: 11.05 ° C.<br>Average apparent temperature when wind speed is greater than or equal to 20 km/h: 9.32° C. |
| Data cross-check, statistical analysis, statistical charts | Based on the existing file, calculate the average 'Wind Speed (km/h)' when "Temperature (C.)' is below 10 degrees and the average 'Wind Speed (km/h)' when Temperature (C.)' is above 10 degrees, and present the results in a graph. | When 'Temperature (C.)' is below 10 degrees, the average 'Wind Speed (km/h)' is 11.068 km/h.<br>When 'Temperature (C.)' is higher than 10 degrees, the average 'Wind Speed (km/h)' is 10.602 km/h. |

Taking the question "Based on the existing file, calculate the average temperature ('Temperature (C)') when visibility ('Visibility (km)') is greater than or equal to 10 km and the average temperature ('Temperature (C)') when visibility ('Visibility (km)') is less than 10 km" as an example, since ChatGPT-4o does not have the data cleaning function, the answer obtained is "Based on the existing data, when visibility ('Visibility (km)') is greater than or equal to 10 km, the average temperature ('Temperature (C)') is 14.67° C., and when visibility is less than 10 km, the average temperature is 9.14° C." After comparing the obtained answer with the existing file, it can be found that although the Pass rate reaches 100% when ChatGPT-4o is adopted, which is the same as what is provided in an embodiment of this disclosure, the Coverage rate can reach 76% in an embodiment of this disclosure, while the Coverage rate can merely reach 70% when ChatGPT-4o is adopted.

During testing, it was found that ChatGPT-4o cannot automatically identify semantically similar data and perform conversions during the data cross-check and does not proactively perform data cleaning after cross-checking. The automated data cross-checking system 1 and the automated data cross-checking method 2 provided in one or more embodiments of this disclosure incorporate prompt engineering task planning tools, enhance data understanding capabilities, and add task decomposition and data analysis domain knowledge prompts with data cleaning capabilities, thus constructing a comprehensive problem analysis process.

Taking the question "What is the Pearson correlation coefficient between 'Humidity' and 'Visibility (km)'?" as an example, since ChatGPT-4o does not automatically recognize and convert field data formats (for instance, it does not recognize that "臺" and "台" are just differences in format and does not convert "臺" to "台"), the data cross-check is not successful. The answer obtained by ChatGPT-4o is "The calculated Pearson correlation coefficient between Humidity and Visibility (km) is NaN, which may result from no matching data between these two fields in the merging process of the two files", meaning that no cross-checking result can be generated. Although the Pass rate reaches 100% when ChatGPT-4o is adopted, which is the same as the Pass rate provided in an embodiment of this disclosure, the Coverage rate is poor when ChatGPT-4o is adopted.

Additionally, the automated data cross-checking system and the automated data cross-checking method provided in one or more embodiments of this disclosure significantly differ from ChatGPT-4o in that the automated data cross-checking system provided in one or more embodiments of this disclosure is a local model that can change modules according to users' needs. This is a customization flexibility that ChatGPT-4o does not have.

To sum up, the automated data cross-checking system and the automated data cross-checking method provided in one or more embodiments of this disclosure enable users to directly interact with databases using natural language for data analysis. These embodiments incorporate professional statistical and data processing capabilities, automate task decomposition and planning, generate the high-quality, low-error program code, fully perform statistical analysis and chart generation, and return results to the users without requiring additional manual operations. Besides, the system and the method operate with a low usage threshold, enhancing work efficiency. Moreover, in one or more embodiments of the disclosure, the system and the method support cross-checking a plurality of datasets. By automatically interpreting field content for cross-checking, the cross-checking process can be fully automated, eliminating the need for manual intervention.

It will be apparent to those skilled in the art that various modifications and variations can be made to the disclosed embodiments without departing from the scope of the disclosure. The specification and examples are provided for illustrative purposes only and are not intended to be limiting. The scope of the disclosure is defined by the following claims and their equivalents.

What is claimed is:

1. An automated data cross-checking system, comprising:

a memory, configured to store a plurality of agent programs;

a processor, coupled to the memory and configured to:

receive a question string and verify a key field content of the question string;

read and execute the agent programs to parse the key field content;

determine whether to execute a data cross-check based on the key field content;

in response to determining to execute the data cross-check, search and read a plurality of datasets related to the key field content, execute the agent programs to parse fields of each of the plurality of datasets, and generate a cross-checking instruction and output a corresponding cross-checking prompt, wherein each of the plurality of datasets comprises a plurality of the fields;

receive a verification string related to the cross-checking prompt;

execute the agent programs to generate a program code based on the cross-checking instruction and the verification string;

execute the program code to generate a cross-checking result file; and outputting a cross-checking result string corresponding to the question string based on the cross-checking result file.

2. The automated data cross-checking system according to claim 1, wherein the processor is further configured to receive the plurality of datasets and store the plurality of datasets to the memory.

3. The automated data cross-checking system according to claim 1, wherein the processor is further configured to receive the plurality of datasets pre-stored in a database.

4. The automated data cross-checking system according to claim 1, wherein in response to no need of executing the data cross-check, the processor is further executed to search and read one of the plurality of datasets related to the key field content, execute the agent programs to parse the fields of the one of the plurality of datasets, generate the cross-checking instruction, and output the corresponding cross-checking prompt.

5. The automated data cross-checking system according to claim 1, wherein each of the fields comprises a field name and field data.

6. The automated data cross-checking system according to claim 5, wherein the cross-checking prompt comprises a modification prompt for the field name of each of the fields of each of the plurality of datasets.

7. The automated data cross-checking system according to claim 5, wherein the cross-checking prompt comprises a modification prompt for the field data of each of the fields of each of the plurality of datasets.

8. The automated data cross-checking system according to claim 5, wherein the cross-checking prompt comprises a merging prompt for at least one of the fields of the plurality of datasets.

9. The automated data cross-checking system according to claim 1, wherein the agent programs comprise a machine learning model.

10. An automated data cross-checking method, comprising:

executing through a processor:

receiving a question string and verifying a key field content of the question string;

reading and executing a plurality of agent programs to parse the key field content;

determining whether to execute a data cross-check based on the key field content;

in response to determining to execute the data cross-check, searching and reading a plurality of datasets related to the key field content, executing the agent programs to parse fields of each of the plurality of datasets, and generating a cross-checking instruction and outputting a corresponding cross-checking prompt, wherein each of the plurality of datasets comprises a plurality of the fields;

receiving a verification string related to the cross-checking prompt;

executing the agent programs to generate a program code based on the cross-checking instruction and the verification string;

executing the program code to generate a cross-checking result file; and outputting a cross-checking result string corresponding to the question string based on the cross-checking result file.

11. The automated data cross-checking method according to claim 10, further comprising:

through the processor receiving the plurality of datasets and storing the plurality of datasets to a memory.

12. The automated data cross-checking method according to claim 10, further comprising:

through the processor receiving the plurality of datasets pre-stored in a database.

13. The automated data cross-checking method according to claim 10, wherein in response to no need of executing the data cross-check, the automated data cross-checking method further comprises:

through the processor reading one of the plurality of datasets, executing the agent programs to parse the fields of the one of the plurality of datasets, generating the cross-checking instruction, and outputting the corresponding cross-checking prompt.

14. The automated data cross-checking method according to claim 10, wherein each of the fields comprises a field name and field data.

15. The automated data cross-checking method according to claim 14, wherein the cross-checking prompt comprises a modification prompt for the field name of each of the fields of each of the plurality of datasets.

16. The automated data cross-checking method according to claim 14, wherein the cross-checking prompt comprises a modification prompt for the field data of each of the fields of each of the plurality of datasets.

17. The automated data cross-checking method according to claim 14, wherein the cross-checking prompt comprises a merging prompt for at least one of the fields of the plurality of datasets.

18. The automated data cross-checking method according to claim 10, wherein the agent programs comprise a machine learning model.

* * * * *